(12) United States Patent
Sciancalepore et al.

(10) Patent No.: US 10,531,240 B1
(45) Date of Patent: Jan. 7, 2020

(54) USER LOCALIZATION PROCESS LEVERAGING UAVS EQUIPPED WITH LIGHTWEIGHT BASE STATION TO PROVIDE A MOVING MOBILE NETWORK

(71) Applicant: NEC Laboratories Europe GmbH, Heidelberg (DE)

(72) Inventors: Vincenzo Sciancalepore, Heidelberg (DE); Antonio Albanese, Heidelberg (DE); Xavier Costa Perez, Heidelberg (DE)

(73) Assignee: NEC CORPORATION, Tokyo (JP)

( * ) Notice: Subject to any disclaimer, the term of this patent is extended or adjusted under 35 U.S.C. 154(b) by 0 days.

(21) Appl. No.: 16/172,905

(22) Filed: Oct. 29, 2018

(51) Int. Cl.
*H04W 64/00* (2009.01)
*H04W 4/029* (2018.01)
*B64C 39/02* (2006.01)
*G01S 19/46* (2010.01)
*G01S 19/11* (2010.01)
*H04W 76/10* (2018.01)
(Continued)

(52) U.S. Cl.
CPC ........... *H04W 4/029* (2018.02); *B64C 39/024* (2013.01); *G01S 19/11* (2013.01); *G01S 19/46* (2013.01); *B64C 2201/122* (2013.01); *B64C 2201/145* (2013.01); *G06N 20/00* (2019.01); *H04B 17/318* (2015.01); *H04L 43/0864* (2013.01); *H04W 76/10* (2018.02); *H04W 84/042* (2013.01)

(58) Field of Classification Search
CPC ..... H04W 16/26; H04W 4/90; H04W 84/047; H04W 84/06; H04W 88/08; H04W 8/005; H04W 64/00; H04W 64/003; H04W 84/042; H04W 84/12; H04B 17/318; H04B 7/18506; H04B 7/18508; H04B 7/26

See application file for complete search history.

(56) References Cited

U.S. PATENT DOCUMENTS 6,388,615 B1    5/2002  Chang et al.
8,260,323 B1 *  9/2012  Bronner ............... H04W 4/02
                                              455/456.6
(Continued)

OTHER PUBLICATIONS

3GPP TR 36.809 V12.0.0 (Sep. 2013), 3$^{rd}$ Generation Partnership Project; Technical Specification Group Radio Access Network; Radio Frequency (RF) pattern matching location method in LTE (Release 12), Sep. 2013, pp. 1-23.
(Continued)

*Primary Examiner* — Quan M Hua
(74) *Attorney, Agent, or Firm* — Leydig, Voit & Mayer, Ltd.

(57) ABSTRACT

A system for localizing user devices includes an unmanned aerial vehicle (UAV). The UAV includes a transceiver configured to establish a communicative connection with a user device, and retrieve information pertaining to the user device at each of a plurality of different points in time. The UAV further includes a satellite-localization system configured to ascertain a geographic location of the UAV at each of the plurality of different points in time, and a processor. The processor is configured to, based on the information pertaining to the user device retrieved at each of the plurality of different points in time and on the geographic location of the UAV at each of the plurality of different points in time, determine a location of the user device.

19 Claims, 5 Drawing Sheets

(51) Int. Cl.
  *H04B 17/318* (2015.01)
  *H04L 12/26* (2006.01)
  *H04W 84/04* (2009.01)
  *G06N 20/00* (2019.01)

(56) References Cited

U.S. PATENT DOCUMENTS

| | | | |
|---|---|---|---|
| 9,537,561 B1* | 1/2017 | Kotecha | H04B 7/18506 |
| 9,571,978 B1 | 2/2017 | Ananth | |
| 9,826,415 B1* | 11/2017 | Byrne | G08B 25/10 |
| 9,866,313 B1* | 1/2018 | Murphy | H04B 7/18504 |
| 2016/0117932 A1* | 4/2016 | Park | G01S 19/39 |
| | | | 701/3 |

OTHER PUBLICATIONS

3GPP TS 36.111 V11.4.0 (Sep. 2014), 3$^{rd}$ Generation Partnership Project; Technical Specification Group Radio Access Network; Location Measurement Unit (LMU) performance specification; Network based positioning systems in Evolved Universal Terrestrial Radio Access Network (E-UTRAN) (Release 11), Sep. 2014, pp. 1-33.

3GPP TS 36.305 V14.0.0 (Dec. 2016), "3$^{rd}$ Generation Partnership Project; Technical Specification Group Radio Access Network; Evolved Universal Terrestrial Radio Access Network (E-UTRAN); Stage 2 functional specification of User Equipment (UE) positioning in E_UTRAN (Release 14)", Dec. 2016, pp. 1-75.

Francesco Betti Sorbelli, et al., "Precise Localization in Sparse Sensor Networks using a Drone with Directional Antennas", ICDCN '18, Jan. 4-7, 2018, pp. 1-10.

Anwen Wang, et al., "GuideLoc: UAV-Assisted Multitarget Localization System for Disaster Rescue", Hindawi Mobile Information Systems, Dec. 2017, pp. 1-14.

Karthikeyan Sundaresan, et al., "SkyLiTE: End-to-End Design of Low-altitude UAV Networks for Providing LTE Connectivity", arXiv:1802.06042v2 [cs.NI], Feb. 20, 2018, pp. 1-15.

\* cited by examiner

USER LOCALIZATION PROCESS LEVERAGING UAVS EQUIPPED WITH LIGHTWEIGHT BASE STATION TO PROVIDE A MOVING MOBILE NETWORK

FIELD

The present invention is generally related to moving mobile networks, and in particular to utilizing unmanned aerial vehicles (UAVs) to perform user localization in moving mobile networks.

BACKGROUND

User localization capabilities are of significant importance to modern information and communication networks. In designing and deploying their own infrastructures, network providers have addressed the need to provide user localization capabilities. In particular, the ability of network systems to automatically retrieve (or to retrieve in an on-demand fashion) exact positions of users enables providers of over-the-top applications (or even the network provider itself) to deliver additional (and advanced) services that rely on user context information. In addition, the ability of network systems to determine exact positions of users is also of significant benefit in emergency situations. Due to their growing ubiquity, cellular network deployments are more frequently being utilized in responding to such emergency situations.

User localization capabilities have been deeply discussed within the international standardization groups (ISG) in order to provide common guidelines for different network equipment producers to adhere to. The 3GPP standard body has enumerated several localization techniques. A number of localization techniques rely on data observed by network entities. For example, in Cell ID (CID) techniques, network systems localize cellular devices to the geographical position of its serving base station. However, given the often broad range of coverage of each single cell, CID techniques do not allow network systems to obtain exact positions of users. CID can be enhanced by exploiting ranging measurements such as Time of Arrival (TA) or Round-Trip Time (RTT) measurements. For example, in Enhanced Cell ID (E-CID) techniques, CID techniques are combined with additional measurements such as Angle of Arrival (AoA) measurements, timing (TA or RTT) measurements, and signal strength measurements. In Radio Frequency Pattern Matching (RFPM) techniques, network systems localize each respective cellular device at a geographical position associated with a signal fingerprint (selected from an available fingerprint database) that best matches the respective cellular device. The fingerprints in such fingerprint database are typically made by Received Signal Strength (RSS) measurements. An example of such an RFPM technique is provided in the non-patent literature of "RF pattern matching location method in LTE, release 12, V12.0.0," 3GPP, Sophia Antipolis, France, Rep. 3GPP TR 36.809, September 2013.

Additional localization techniques are based on trilateration processes. For example, in Uplink Time Difference of Arrival (UTDoA), network systems localize cellular devices by comparing a time difference of arrival of uplink signals, such as a Sounding Reference Signal (SRS), to Location Measurement Units (LMUs) placed at known locations. An example of such an UTDoA technique is provided in the non-patent literature of "LMU performance specification; network based positioning systems in E-UTRAN, release 11, V11.4.0," 3GPP, Sophia Antipolis, France, Rep. 3GPP TS 36.111, October 2014. In Observed Time Difference of Arrival (OTDoA) techniques, a user device obtains measurements of a time difference between Positioning Reference Signals (PRSs) received from different eNodeBs and reports back such measurements to a Location Server (LS). The LS then localizes the device by using the measurements reported by the device. An example of such an OTDoA technique is provided in the non-patent literature of "Stage 2 functional specification of UE positioning in E-UTRAN, release 14, V14.0.0," 3GPP, Sophia Antipolis, France, Rep. 3GPP TS 36.305, December 2016. Both UTDoA and OTDoA require coordination between different eNBs to apply the trilateration concept. This can result in additional delays and decreased accuracy due to increased randomness of wireless channel conditions resulting from an increase in the number of paths between the user and the eNBs.

In addition to the aforementioned 3GPP localization techniques, a number of additional non-3GPP localization techniques have also previously been employed. For example, in assisted GNSS (A-GNSS), assistance data of GNSS systems is distributed in a cellular network to aid a GNSS receiver of the cellular device. In barometric techniques, on-board barometric sensors are utilized to bring improvements in vertical accuracy of the localization. However, such non-3GPP techniques require non-3GPP equipment can require the use of untrusted information.

Furthermore, several localization techniques employ the use of unmanned aerial vehicles (UAVs). A localization algorithm for use in a Wireless Sensor Network (WSN) that employs a UAV equipped with directional antennas is described in the non-patent literature of Sorbelli, S. K. Das, C. M. Pinotti and S. Silvestri, "Precise Localization in Sparse Sensor Networks Using a Drone with Directional Antennas", ACM ICDCN '18, January 2018. In the localization algorithm described therein, each sensor is aware of a path of a drone and can calculate its own positioned using a trilateration process.

A UAV-based localization system that makes use of a combination of RSSI and AOA techniques to localize users is described in the non-patent literature of A. Wang, X. Ji, D. Wu, et al., "GuideLoc: UAV-Assisted Multitarget Localization System for Disaster Rescue," Mobile Information Systems, 2017. In the localization system described therein, a preliminary partitioning of a target area is performed if it is larger than or equal to a communication range of the wireless devices. Thereafter, a UAV flies along an optimal path throughout all the unit partitions. When the UAV arrives at a unit partition center, it visits the current unit partition only if one or more targets are in range, otherwise it moves to the next one. If targets are detected, the UAV estimates their location by means of relative received signal strength (RSSI) and AOA, and uses a genetic algorithm to plan an optimal path to visit each target. The AOA technique is used to estimate a direction in which the UAV must fly in order to reach a target. During the flight, an averaging method on RSSI is used to recognize whether the UAV is over the target. In the affirmative case, GuideLoc infers the target's coordinates as the GPS coordinates of the UAV.

A localization technique utilizing a high altitude platforms (HAPs) for determining geographical positions of ground users is described in U.S. Pat. No. 9,571,978. However, HAPs are usually placed at very high altitudes that can cause inaccuracies in a user position discovery process. In addition, HAPs are not easily moved, and therefore, are not able to easily follow a pre-defined trajectory in order to speed up a user localization process.

SUMMARY

In an embodiment, the present invention provides a system for localizing user devices. The system includes an unmanned aerial vehicle (UAV). The UAV includes a transceiver configured to establish a communicative connection with a user device, and retrieve information pertaining to the user device at each of a plurality of different points in time. The UAV further includes a satellite-localization system configured to ascertain a geographic location of the UAV at each of the plurality of different points in time, and a processor. The processor is configured to, based on the information pertaining to the user device retrieved at each of the plurality of different points in time and on the geographic location of the UAV at each of the plurality of different points in time, determine a location of the user device.

BRIEF DESCRIPTION OF THE DRAWINGS

The present invention will be described in even greater detail below based on the exemplary figures. The invention is not limited to the exemplary embodiments. All features described and/or illustrated herein can be used alone or combined in different combinations in embodiments of the invention. The features and advantages of various embodiments of the present invention will become apparent by reading the following detailed description with reference to the attached drawings which illustrate the following.

DETAILED DESCRIPTION

Figure 1:
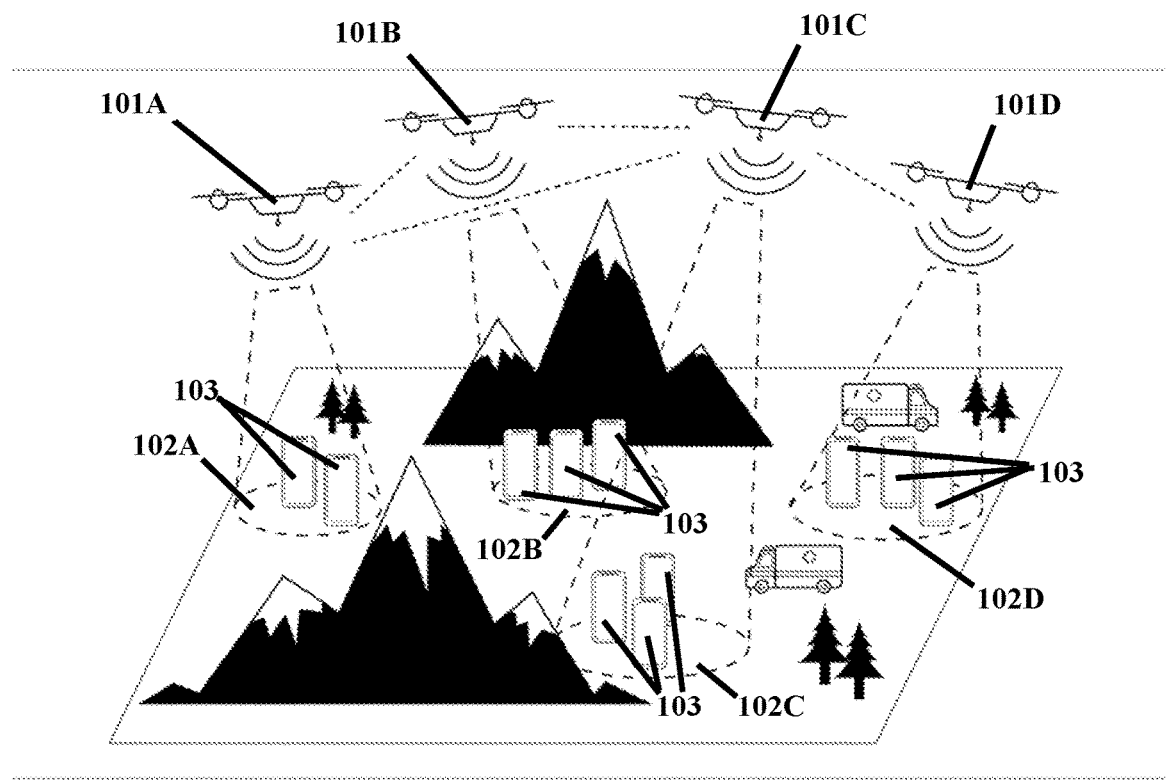
FIG. 1 depicts a moving mobile network scenario in which a wireless network is provided by a plurality of UAV-mounted eNBs.

A number of challenges arise in localizing users in an information and communication network with a high degree of accuracy. As users are often located in complex urban agglomerations and often move—sometimes at high speeds—into, out of, and within such environments, wireless channel conditions can vary significantly from one point in time to another. In turn, the accuracy of location information provided by cellular networks can be relatively poor. For example, the effectiveness of the aforementioned techniques is often limited in attempting to localize users in dense-urban areas where multiple overlapping eNB coverage areas (often more than ten such overlapping coverage areas) are needed to cope with severe shadowing issues and obtain exact user position information. Furthermore, the aforementioned techniques are not effective for localizing users in disaster situations in which a user device is out of the overlapped coverage of several base stations and in which very few signal fingerprints (which can be used to quickly and correctly retrieve a current position of a user) are available in databases. In emergency scenarios it is preferable not to rely on on-board, non-3GPP equipment (e.g. GNSS or GPS receivers) that might not be present in older-generation cellular devices and that might return unreasonable results even when they are present.

One or more embodiments of the present invention provides a user localization system that is both easily implementable and effective in dense urban agglomerations, in emergency situations, and in disaster areas. One or more embodiments of the present invention provides a single UAV with a lightweight eNB mounted thereto. The UAV-mounted eNB (which can be referred to as a mobile eNB) can be used to calculate the ground positions of users with increased accuracy and reliability as compared to prior art localization techniques. Furthermore, the UAV-mounted eNB can provide a highly accurate position of a user within a very short period of time.

One or more embodiments of the present invention provides for continuous cellular connectivity by designing a moving mobile network provided by UAVs equipped with lightweight eNBs. In this manner, user position can be accurately calculated by a single mobile eNB continuously connected with the ground-based users. In addition, machine-learning techniques that consider measurements made along a specific path at different points in time can be utilized to facilitate user localization.

One or more embodiments of the present invention rely on a 3GPP LTE (or LTE-A or 5G) network, provides connectivity to different ground users via mobile eNBs mounted on UAVs, and allows a single mobile eNB to calculate the position of any single user connected thereto without any precomputed information regarding a path to follow while flying. Such features provide for localization capabilities that are particularly suitable for emergency situations and disaster events.

One or more embodiments of the invention provides a user localization system including a UAV-mounted eNB that provides continuous connectivity to ground users while gathering different transmission information at different locations to accurately infer exact geographical positions of such ground users by way of machine-learning techniques.

One or more embodiments of the invention provides a mobile eNB that flies over a selected area to locate a specific user based on an attach message received from the specific user and an international mobile subscriber identity (IMSI) corresponding to the specific user.

One or more embodiments of the invention provides a mobile eNB used to continuously monitor the location of a specific ground-user while proactively following its movements.

According to an embodiment of the invention, a system is provided for localizing a user device. The system includes an unmanned aerial vehicle (UAV) including a transceiver configured to establish a communicative connection with a user device, and retrieve information pertaining to the user device at each of a plurality of different points in time. The UAV further includes a satellite-localization system configured to ascertain a geographic location of the UAV at each of the plurality of different points in time and a processor configured to determine, based on the information pertaining to the user device retrieved at each of the plurality of different points in time and on the geographic location of the UAV at each of the plurality of different points in time, a location of the user device. The UAV can move at a speed of travel such that the UAV is located at different geographical positions at each of the plurality of different points in time. The transceiver and the processor can collectively form a base station of a mobile telecommunication cellular network. The mobile telecommunication cellular network is one of a 3GPP LTE, LTE-A, or 5G mobile telecommunication cellular network. The processor can determine the location of the user device without using any data collected via any additional base station of the mobile telecommunication cellular network.

The satellite localization system can include a receiver configured to receive data transmitted by one or more satellites and a processor configured to decode the data received by the receiver. The one or more satellites are navigation satellites of at least one of the global positioning system (GPS) and the global navigation satellite system (GLONASS).

The transceiver can be configured to retrieve information pertaining to the user device at each of the plurality of different points in time by transmitting, at each of the plurality of different points in time, a data packet to the user device, and receiving, in response to each transmitted data packet, a corresponding receipt acknowledgement from the user device.

The processor can be configured to compute, for each respective point in time of the plurality of different points in time, at least one of a received signal strength indicator (RSSI) and a round trip time (RTT) based on the data packet transmitted at the respective point in time and the corresponding receipt acknowledgment. The processor can be configured to determine the location of the user device by using the at least one of the RSSI and the RTT for each of the plurality of different points in time and the geographic location of the UAV at each of the plurality of different points in time. The processor can be further configured to determine that the at least one of the RSSI and the RTT exhibits bias. The processor can be configured to, in response to determining that the at least one of the RSSI and the RTT exhibits bias, employ machine-learning techniques to determine the location of the user device. The processor can be further configured to, in response to determining that the at least one of the RSSI and the RTT exhibits bias, instruct the UAV to increase a speed of travel and retrieve information pertaining to the user device at each of a plurality of further points in time while moving at the increased speed of travel.

According to an embodiment of the invention, a computer readable medium having stored thereon instructions for performing a method for localizing a user device is provided. The method includes providing an unmanned aerial vehicle (UAV) including a transceiver, a satellite-localization system, and a processor. The method further includes propelling the UAV at a non-zero speed of travel, establishing, by the transceiver, a communicative connection with a user device, retrieving, by the transceiver at each of a plurality of different points in time, information pertaining to the user device, and determining, by the satellite-localization system, a geographic location of the UAV at each of the plurality of different points in time. In addition, the method includes determining, by the processor and based on the information pertaining to the user device retrieved at each of the plurality of different points in time and on the geographic location of the UAV at each of the plurality of different points in time, a location of the user device.

According to an embodiment of the invention, a method for localizing a user device is provided. The method includes providing an unmanned aerial vehicle (UAV) including a transceiver, a satellite-localization system, and a processor. The method further includes propelling the UAV at a non-zero speed of travel, establishing, by the transceiver, a communicative connection with a user device, retrieving, by the transceiver at each of a plurality of different points in time, information pertaining to the user device, and determining, by the satellite-localization system, a geographic location of the UAV at each of the plurality of different points in time. In addition, the method includes determining, by the processor and based on the information pertaining to the user device retrieved at each of the plurality of different points in time and on the geographic location of the UAV at each of the plurality of different points in time, a location of the user device.

FIG. 1 depicts a moving mobile network scenario in which a wireless network is provided by a plurality of UAV-mounted eNBs (mobile eNBs). One or more embodiments of the present invention leverage motion of the mobile eNBs—which serve a plurality of users in different ground areas—in order to locate such users. FIG. 1 depicts a plurality of mobile eNBs 101A through 101D which each serves a particular ground area 102A through 102D. Each of the mobile eNBs is a UAV having mounted thereupon a lightweight evolved node-B. Each lightweight evolved node-B includes a transceiver configured to establish a communicative connection with one or more user devices, i.e. to transmit data to the one or more user devices and to receive data from the one or more user devices. Furthermore, each lightweight evolved node-B includes a processor (e.g. a digital signal processor) configured to perform radio control functions, e.g. signal modulation and encoding. Each of the mobile eNBs 101A through 101D further includes a satellite-localization system configured to ascertain a geographic location of the UAV at each of the plurality of different points in time. The satellite-localization system includes, e.g., a receiver configured to receive data from one or more satellites and a processor configured to decode the data received by the receiver and to ascertain a geographic location of the UAV based on the decoded data. A plurality of users (each of which corresponds to a particular user device, or user equipment, 103A.1 to 103D.3) are located in each of the particular ground areas. Each of the user devices also includes a transceiver configured to establish a communicative connection with one or more of the mobile eNBs and a processor configured to perform radio control functions.

The mobile eNBs (which, in FIG. 1, are UAVs equipped with lightweight LTE eNBs) can be optimally placed to efficiently serve the ground users. In other words, the mobile eNBs can be placed so as to, e.g., maximize coverage, maximize throughput, and/or minimize service disruption. In order to locate a user device, the mobile eNB to which the user device is connected to measures user information from at least four different positions. The measurements made by the mobile eNB can include but are not limited to (i) a received signal strength, e.g. a received signal strength indicator (RSSI), and (ii) a Round Trip Time (RTT), which can be calculated as an overall time needed to send a packet from the mobile eNB to the user device and to receive, by the mobile eNB, a receipt acknowledgement of that packet back from the user device.

According to one or more embodiments of the invention, each mobile eNB can move at coverage speeds of up to 2-3 m/s. Such a speed value does not impair the user coverage nor excessively drain the battery of the UAV. As a result of their movement, the mobile eNBs can measure user information of a stationary user device at different geographical locations. As an example, assuming coverage speeds of approximately 2-3 m/s (which allow for minimal UAV battery consumption) and an average UAV altitude of about 100 meters, it is necessary to measure user information roughly every 10 seconds in order to provide consistent data for processing. After at least four measurements are taken under such conditions (the time during which such consecutive measurements are taken can be referred to as a localization window), the mobile eNB can apply a trilateration procedure in three-dimensional space to determine a location of a user device with a very high degree of accuracy.

Figure 2:
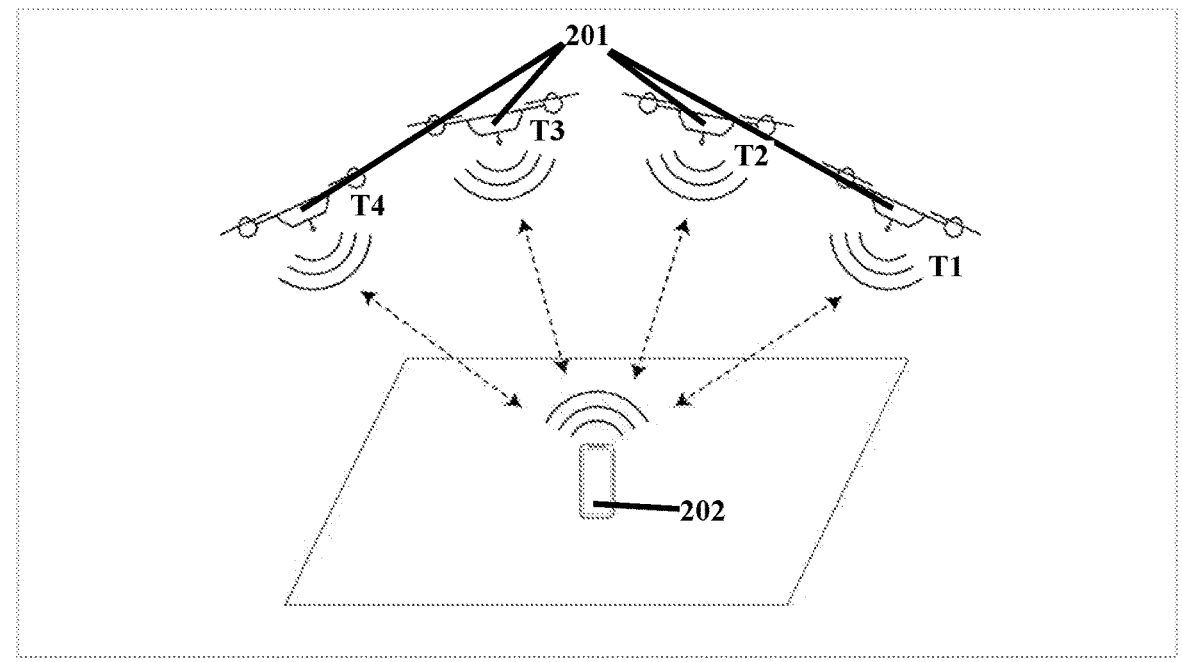
FIG. 2 illustrates a process for determining a ground location of a single user device using a UAV-mounted eNB.

FIG. 2 illustrates a process for determining a ground location of a single user device using a UAV-mounted eNB. The UAV-mounted eNB (mobile eNB) 201 travels through the air above the user device 202 at a coverage speed. The mobile eNB 201 includes all of the same components as one of the mobile eNBs 101A through 101D described in connection with FIG. 1. At four consecutive times, i.e. T1, T2, T3, and T4, the mobile eNB measures user information of the user device 202. The user information can include, e.g., an RSSI and an RTT. In order to determine the position at which the mobile eNB is located at each of times T1 through T4 (and thus the position at which the mobile eNB is located when the user information is measured), the mobile eNB is equipped with a satellite navigation system antenna configured to communicate with satellites in order to determine its own position. Such satellite navigation systems can include, e.g., the global positioning system (GPS) satellite system and/or the global navigation satellite system (GLONASS).

The high degree of accuracy with which the UAV-mounted eNB 201 can determine the location of the user device 202 is ensured by a high probability of realizing ground user-mobile eNB connection through a Line-of-Sight (LoS) that is weakly affected by the shadowing effect. However, in order to determine the location of the user device 202 with the highest possible degree of accuracy, the location of the user device 202 must be fixed during the localization window. If the location of the user device 202 is not fixed during the localization window, the accuracy with which the mobile eNB 201 can determine the location of the user device 202 decreases. Furthermore, if the user device 202 moves at a speed greater than the coverage speed of the mobile eNB 201, the mobile eNB may determine inconsistent location values for the user device 202.

In situations where the accuracy of the location of the user device 202 as determined by the mobile eNB 201 is impaired due to movement of the user device 202, one or more embodiments of the present invention can additionally employ machine-learning techniques in order to ascertain a direction and speed of the user device 202. Such machine-learning techniques are particularly applicable in situations where the user device 202 is moving at a faster speed than the mobile eNB 201. Once the direction and speed of the user device 202 have been determined, a predetermined motion path of the mobile eNB 201 can be altered such that the mobile eNB 201 will traverse a series of positions during a localization window from which user information measurements can be made that will enable the mobile eNB 201 to more accurately determine the location of the moving user device 202. Depending on the direction and speed of the user device 202, additional user information measurements (more than 4) may be required in order to accurately determine the location of the moving user device 202. Taking such additional measurements requires additional time, and therefore, when the user device 202 is moving and additional user information measurements are required, delays in determining the location of the user device 202 may result.

Figure 3:
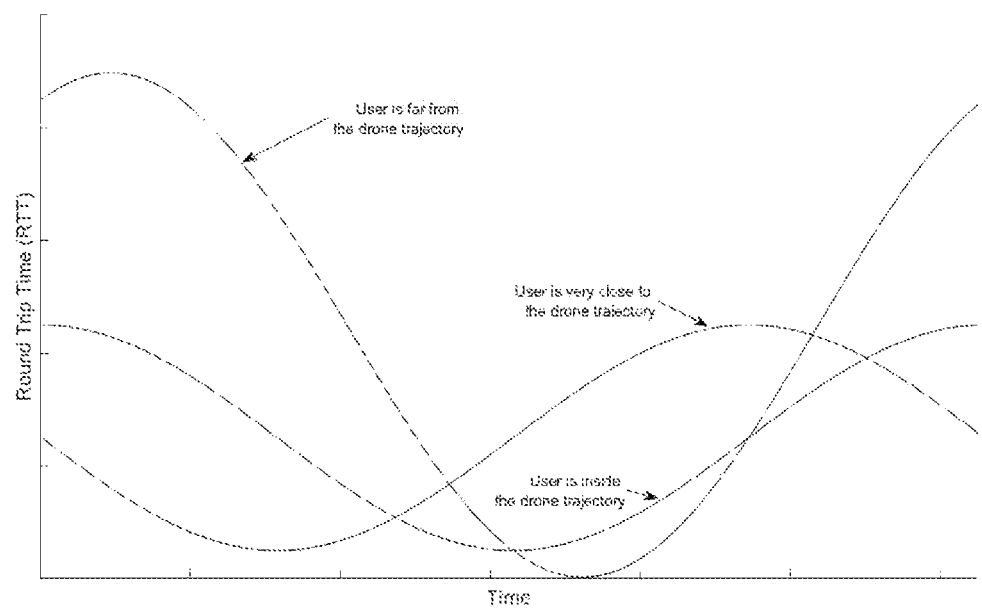
FIG. 3 depicts round trip time evolution for different user locations with respect to a UAV-mounted eNB moving in a closed-loop trajectory.
Figure 4:
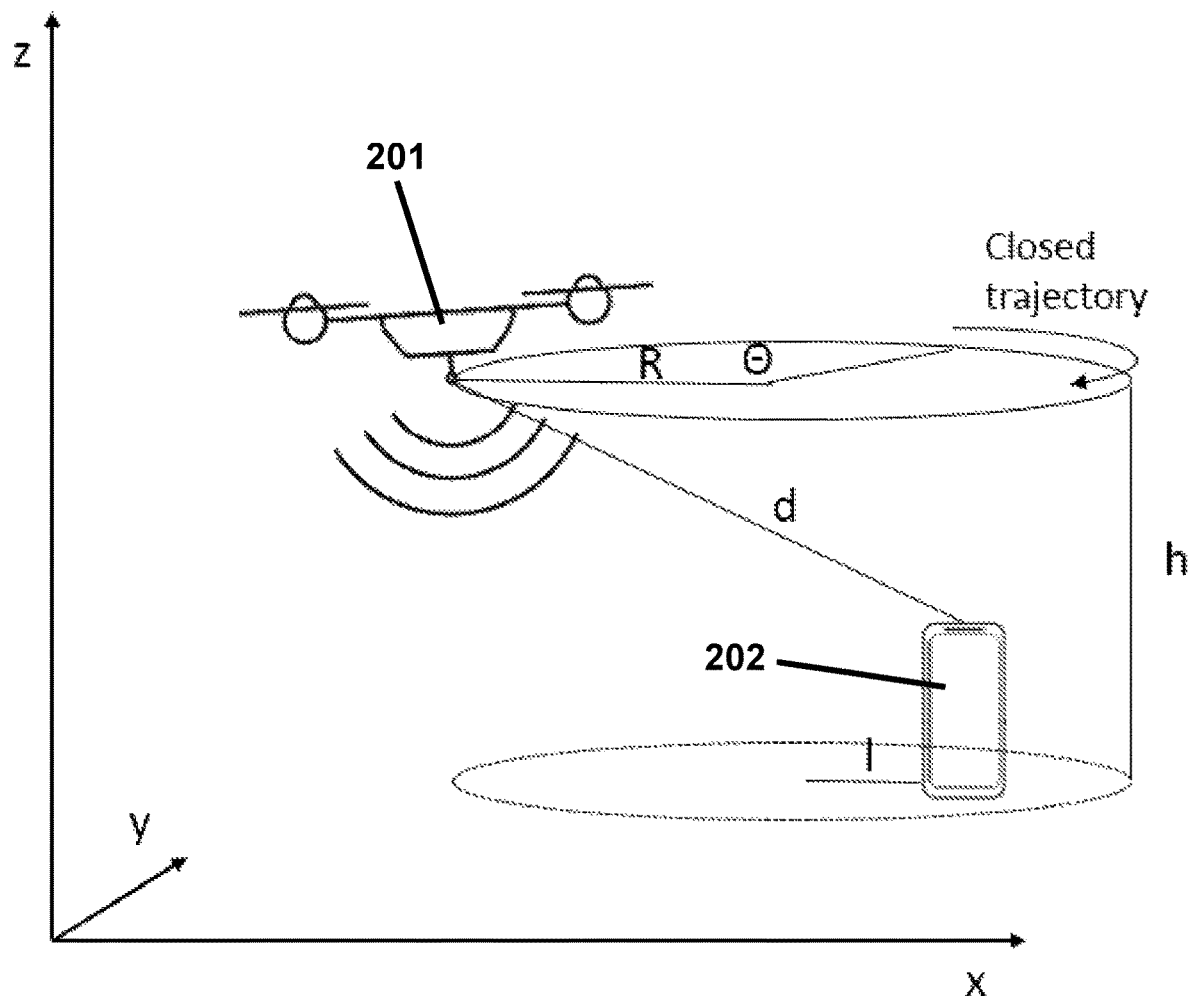
FIG. 4 illustrates a scenario in which a user device is located inside a closed trajectory of a UAV-mounted eNB.
Figure 5:
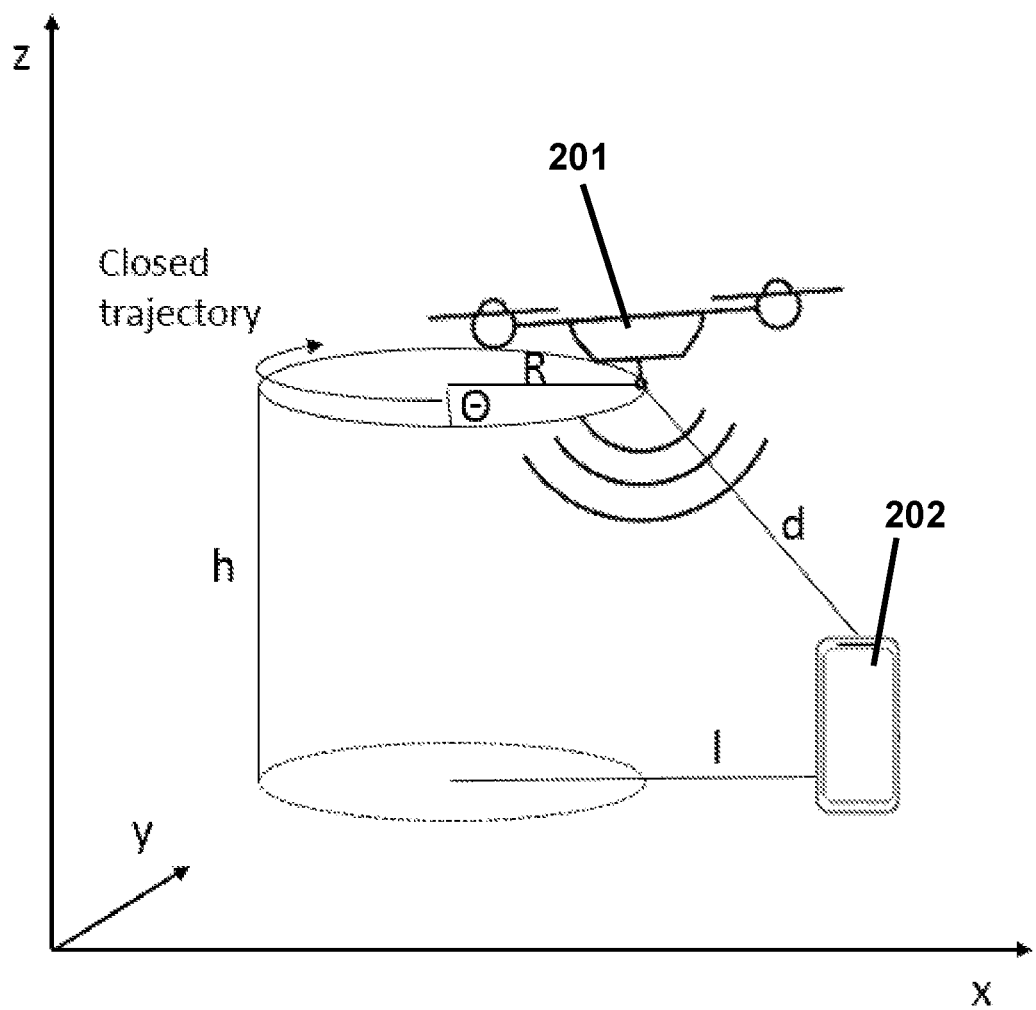
FIG. 5 illustrates a scenario in which a user device is located outside a closed trajectory of a UAV-mounted eNB.

In order to determine whether the location of the user device 202 as determined by the mobile eNB 201 is sufficiently accurate, an analysis of the round trip time (RTT) of pilot messages transmitted by the mobile eNB 201 while is follows a closed-loop, i.e. circular, trajectory is conducted. Specifically, the mobile eNB 201 continuously tracks the round trip time (RTT) of its pilot messages (sent every 0.5 ms according to the 3GPP specifications). If the location of the user device 202 is static, the RTT should follow a sinusoidal behavior—as depicted in FIG. 3 (which shows round trip time evolution for different user locations with respect to a closed trajectory of the mobile eNB 201). The sinusoidal behavior of the RTT is independent from the altitude of the mobile eNB 201 and can be calculated as follows: $d(\theta)=\sqrt{l^2+h^2+2R(R\mp l)(1-\cos\theta)}$ (if the user device 202 is located inside of a closed trajectory of the mobile eNB 201 at a distance l discarding the altitude), and $d(\theta)=\sqrt{l^2+h^2+2R(R+l)(1\mp\cos\theta)}$ (if the user device 202 is located outside of a closed trajectory of the mobile eNB 201 at distance l discarding the altitude). Here, $\theta$ is the rotation angle of the mobile eNB 201 when following a circular trajectory. FIG. 4 illustrates a scenario in which the user device 202 is located inside a closed trajectory of the mobile eNB 201 and located at a distance l from the center of the closed, circular trajectory of the mobile eNB 201. FIG. 5 illustrates a scenario in which the user device 202 is located outside of a closed trajectory of the mobile eNB 201 and located at a distance l from the center of the closed, circular trajectory of the mobile eNB 201.

If the location of the user device 202 is not static (i.e. the user device 202 is moving), the sinusoidal behavior of the RTT may show some bias, i.e. a difference between an expected RTT when the user is not moving and a real, measured RTT. When the bias exceeds a given threshold, an alert message is triggered. The threshold could be established, e.g., after a training phase and could be dependent on antenna gain and frequency of the signals transmitted between the user device 202 and the mobile eNB 201. Once the alert message is triggered, the mobile eNB 201 can, e.g., increase its coverage speed to a speed that exceeds the speed of the moving user device 202 in order to optimally track the position of the moving user device 202. Once the mobile eNB 201 has increased its coverage speed so as to be able to perfectly draw the RTT curve corresponding to the user device 202 as a function of the time and accurately determined the dynamic location of the user device 202, the mobile eNB 201 can again decrease its speed in order to prolong battery life.

According to an embodiment of the invention, an on-demand moving mobile network is provided. The on-demand moving mobile network includes a plurality of UAV-mounted base stations (e.g. mobile eNBs) that provide cellular connectivity in a disaster area. The on-demand moving mobile network enables ground users to be located in a quick and effective way while still providing connectivity and coverage. Such an on-demand moving mobile network provides for at least two advantages. A first advantage is that the UAV-mounted base stations can be optimally placed so as to guarantee a minimum Service Level Agreement (SLA) or coverage. Especially in disaster events, such mobile eNBs can infer crowd motion patterns based on a dynamic location of a single user and proactively move towards a defined point-of-interest. In that manner, minimum SLA or coverage can be maintained in spite of the disruptions such disaster events can cause. A second advantage is that such accurate user positions (coupled with additional user context information retrieved by the network operator) may be conveyed for advanced search and rescue operations.

According to an embodiment of the invention, a fleet of UAV-mounted base stations (e.g. mobile eNBs) can be provided for flying over an area affected by an emergency and scanning the area for cellular devices. For example, the fleet of mobile eNBs can scan for user devices that are attempting to connect to a cellular network via radio resource control (RRC) messages and the mobile eNB will accept unknown IMSI (as per the emergency-call procedure) and establish the connection successfully. In addition, the network can assign specific users (e.g. using the International Mobile Subscriber Identities (IMSIs) of corresponding UEs) to connect to a particular mobile eNB (e.g. by use of the Cell Range Extension-CRE technique). This might require the network manager to be aware of such operations so as to trigger network operations, such as forcing disconnection for particular users or retrieving the cell id to which a particular user is currently attached or has previously been attached. Such a fleet of mobile eNBs can provide for significant advantages over a ground-based cellular network infrastructure in circumstances where emergencies occur outside of the range of the ground-based cellular network infrastructure.

Alternatively, for public safety matters, given a rough geographical position of a particular user (provided using, e.g., E-CID or RFPM, as described above), a mobile eNB may fly to a selected area to connect with the specific user and identify its exact position by using a method according to an embodiment of the invention. When properly configured, the mobile eNB can follow the ground user and monitor its movements.

In a further embodiment, a UAV-mounted base station (e.g. a mobile eNB) can be used to rescue a victim submerged under snow. A victim under such circumstances, a civil protection department needs to find a victim quickly as the victim may have only 40-50 minutes to survive. An LTE (or 5G) signal could be used to locate the victim under such circumstances as such signals may offer coverage under the snow. In such an embodiment, a network manager who becomes aware of the accident can retrieve the IMSI associated with the victim and determine which base station the victim was or currently is attached to in order to limit the search-and-rescue area. The network manager can then provide a UAV-mounted base station to connect to the victim's device using the victim's IMSI. If the victim's device is still connected to a fixed base station, the network manager can identify the area and trigger a QUIT message to disconnect the victim's device, e.g., through network management. Thereafter, the UAV-mounted base station can move around the identified area and attempt to synchronize with the victim's device. Once connected, the UAV-cell moves following a closed trajectory to accurately identify the position of the victim. Once the base station has connected with the victim's device, locating the victim could take anywhere from a few seconds up to few minutes. Alternatively, the victim's device could connect to the UAV-mounted base station in emergency-call mode (all IMSIs are accepted). In that case, no network management operations would be required.

Figure 6:
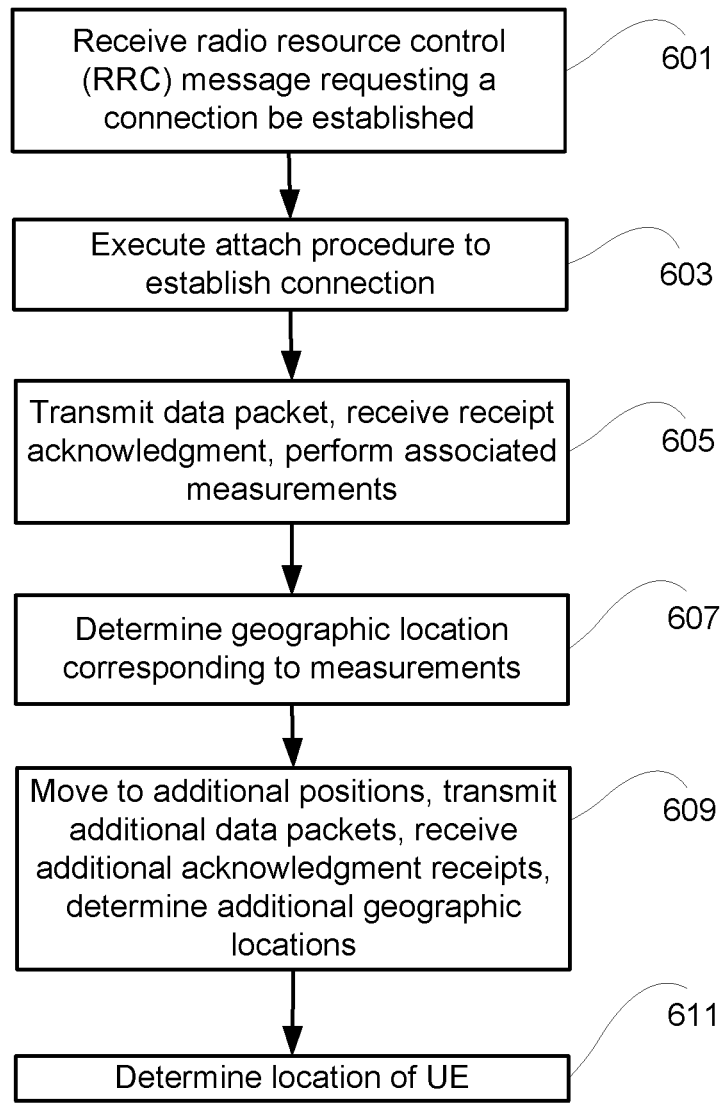
FIG. 6 illustrates a method for using a UAV-mounted eNB to determine a location of a user device according to an embodiment of the invention.

FIG. 6 illustrates a method for using a UAV-mounted eNB to determine a location of a user device according to an embodiment of the invention. The UAV-mounted eNB includes a transceiver configured to establish a communicative connection with on e or more user devices and a processor configured to perform radio control functions, e.g., signal modulation and encoding/decoding. In addition, the UAV-mounted eNB includes a satellite localization system configured to ascertain a geographic location of the UAV. The satellite localization system includes a receiver configured to receive data from one or more satellites and a processor configured to decode the data received by the receiver and to ascertain a geographic location of the UAV based on the decoded data.

At 601, the UAV-mounted eNB receives a radio resource control (RRC) message a UE requesting a connection with a cellular network having a radio access network (RAN) of which the UAV-mounted eNB forms a portion of. At 603, the UAV-mounted eNB and the UE execute an attach procedure by which a connection is established between the UAV-mounted eNB and the UE. At 605, the UAV-mounted eNB transmits a data packet to the UE via the established connection, receives a receipt acknowledgement of the data packet from the UE, and performs associated measurements. The measurements can include a received signal strength indicator (RSSI) and a round trip time (RTT). At 607, the UAV-mounted eNB determines a geographic location corresponding to the associated measurements, e.g. by determining coordinates of the geographic location. The geographic location can be determined, e.g., by decoding data received by the receiver of the satellite localization system. At 609, the UAV-mounted eNB moves to at least three additional geographic locations at three additional points in time and, at each point in time, transmits a data packet to the UE, receives a receipt acknowledgment from the UE, performs associated measurements, and determines coordinates of the geographic location.

At 611, the UAV-mounted eNB determines the location of the UE. In order to determine the location of the UE, the UAV-mounted eNB considers the measurements taken at each of the four points in time and the coordinates of the four geographic locations. In that manner, the UAV-mounted eNB can determine coordinates of the geographic location of the UE. If necessary, the UAV-mounted eNB may also determine at 611 that the measurements performed at the four points in time exhibit some bias. In such circumstances, the UAV-mounted eNB may employ machine learning techniques in order to account for the exhibited bias and accurately determine the coordinates of the geographic location of the UE in spite of the exhibited bias. Alternatively, the UAV-mounted eNB may increase its speed and perform additional measurements at additional points in time and use the additional measurements and corresponding geographic locations in order to determine the location of the UE.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

What is claimed is:

1. A system for localizing user devices, the system comprising:
   an unmanned aerial vehicle (UAV) including:
     a transceiver configured to:
       establish a communicative connection with a user device, and
       retrieve information pertaining to the user device at each of a plurality of different points in time,
     a satellite-localization system configured to ascertain a geographic location of the UAV at each of the plurality of different points in time, and
     a processor configured to:
       cause the UAV to travel along a predetermined closed-loop route such that at each of the plurality of different points in time at which information pertaining to the user device is retrieved, the UAV is located at a different geographic location on the closed loop-route, and
       determine, based on the information pertaining to the user device retrieved at each of the plurality of different points in time and on the different geographic locations on the closed-loop route at which the UAV is located at each of the plurality of different points in time, a location of the user device.

2. The system according to claim 1, wherein the transceiver and the processor collectively form a base station of a mobile telecommunication cellular network.

3. The system according to claim 2, wherein the processor determines the location of the user device without using any data collected via any additional base station of the mobile telecommunication cellular network.

4. The system according to claim 2, wherein the mobile telecommunication cellular network is one of a 3GPP LTE, LTE-A, or 5G mobile telecommunication cellular network.

5. The system according to claim 1, wherein the satellite localization system includes a receiver configured to receive data transmitted by one or more satellites and a processor configured to decode the data received by the receiver.

6. The system according to claim 5, wherein the one or more satellites are navigation satellites of at least one of the global positioning system (GPS) and the global navigation satellite system (GLONASS).

7. The system according to claim 1, wherein the transceiver is configured to retrieve information pertaining to the user device at each of the plurality of different points in time by:
   transmitting, at each of the plurality of different points in time, a data packet to the user device, and
   receiving, in response to each transmitted data packet, a corresponding receipt acknowledgement from the user device.

8. The system according to claim 7, wherein the processor is further configured to compute, for each respective point in time of the plurality of different points in time, at least one of a received signal strength indicator (RSSI) and a round trip time (RTT) based on the data packet transmitted at the respective point in time and the corresponding receipt acknowledgment.

9. The system according to claim 8, wherein the processor is configured to determine the location of the user device by using the at least one of the RSSI and the RTT for each of the plurality of different points in time and the geographic location of the UAV at each of the plurality of different points in time.

10. The system according to claim 8, wherein the processor is further configured to determine that the at least one of the RSSI and the RTT exhibits bias by comparing a sinusoidal time-varying behavior of the at least one of the RSSI and the RTT to an expected sinusoidal time-varying behavior.

11. The system according to claim 10, wherein the processor is further configured to, in response to determining that the at least one of the RSSI and the RTT exhibits bias, employ machine-learning techniques to determine the location of the user device.

12. The system according to claim 10, wherein the processor is further configured to, in response to determining that the at least one of the RSSI and the RTT exhibits bias, instruct the UAV to increase a speed of travel and retrieve information pertaining to the user device at each of a plurality of further points in time while moving along the predetermined closed-loop route at the increased speed of travel.

13. A non-transitory computer readable medium having stored thereon instructions for performing a method for localizing a user device, the method comprising:
   providing an unmanned aerial vehicle (UAV) including a transceiver, a satellite-localization system, and a processor;
   propelling the UAV at a non-zero speed of travel along a predetermined closed-loop route;
   establishing, by the transceiver, a communicative connection with a user device;
   retrieving, by the transceiver at each of a plurality of different points in time, information pertaining to the user device as the UAV travels along the closed-loop route;
   determining, by the satellite-localization system, a different geographic location of the UAV on the closed-loop route at each of the plurality of different points in time at which the information pertaining to the user device is retrieved, and
   determining, by the processor and based on the information pertaining to the user device retrieved at each of the plurality of different points in time and on the different geographic locations of the UAV at each of the plurality of different points in time at which the information pertaining to the user device is retrieved, a location of the user device.

14. A method for localizing a user device, the method comprising:
   providing an unmanned aerial vehicle (UAV) including a transceiver, a satellite-localization system, and a processor;
   propelling the UAV at a non-zero speed of travel along a predetermined closed-loop route;
   establishing, by the transceiver, a communicative connection with a user device;
   retrieving, by the transceiver at each of a plurality of different points in time, information pertaining to the user device as the UAV travels along the closed-loop route;
   determining, by the satellite-localization system, a different geographic location of the UAV on the closed-loop route at each of the plurality of different points in time at which the information pertaining to the user device is retrieved, and determining, by the processor and based on the information pertaining to the user device retrieved at each of the plurality of different points in time and on the different geographic locations of the UAV at each of the plurality of different points in time at which the information pertaining to the user device is retrieved, a location of the user device.

15. The method according to claim 14, wherein the information pertaining to the user device comprises a metric reflecting a latency of communications between the UAV and the user device;

the method further comprising assessing, by the processor, an accuracy of the determined user device location by comparing a time-varying behavior of the metric with a target sinusoidal curve.

16. The method according to claim 15, further comprising:

determining whether the user device is located inside or outside a closed outer perimeter of the predetermined closed-loop route; and determining a shape of the target sinusoidal curve using a first function if the user device is located inside the closed outer perimeter of the predetermined closed-loop route or determining the shape of the target sinusoidal curve using a second function if the user device is located outside the closed outer perimeter of the predetermined closed-loop route.

17. The method according to claim 16, further comprising:

computing a bias based on a difference between (i) the time-varying behavior of the metric and (ii) the target sinusoidal curve; and revising the location of the user device by applying a machine learning technique configured to correct for the computed bias.

18. The method according to claim 14, further comprising:

defining a sinusoidal target curve based on a geometry of the closed-loop route; and determining, with a machine learning technique, the location of the user device based on a difference between (i) a time-varying behavior of a metric quantifying a latency of communications between the transceiver and the user device and (ii) the target sinusoidal curve.

19. The system according to claim 1, wherein the processor is configured to:

define a target sinusoidal curve based on one or more dimensions of the closed-loop route;

compute a difference between (i) a time-varying behavior of a metric quantifying a latency of communications between the transceiver and the user device and (ii) the target sinusoidal curve; and determine, with a machine learning technique, the location of the user device based on the computed difference.

* * * * *